(12) United States Patent
Song

(10) Patent No.: US 11,858,552 B2
(45) Date of Patent: Jan. 2, 2024

(54) SLIDING DOOR MOUNTING REINFORCEMENT STRUCTURE AND VEHICLE BODY PROVIDED WITH THE SAME

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 0 days.

(21) Appl. No.: 17/859,209

(22) Filed: Jul. 7, 2022

(65) Prior Publication Data

US 2023/0182548 A1   Jun. 15, 2023

(30) Foreign Application Priority Data

Dec. 15, 2021   (KR) .......................... 10-2021-0179693

(51) Int. Cl.
| | |
|---|---|
| *B62D 25/02* | (2006.01) |
| *B60J 5/06* | (2006.01) |
| *E05D 15/06* | (2006.01) |
| *B62D 25/04* | (2006.01) |
| *B60J 5/04* | (2006.01) |
| *B62D 25/20* | (2006.01) |

(52) U.S. Cl.
CPC ............ *B62D 25/025* (2013.01); *B60J 5/042* (2013.01); *B60J 5/06* (2013.01); *B62D 25/04* (2013.01); *B62D 25/20* (2013.01); *E05D 15/0686* (2013.01); *E05Y 2201/684* (2013.01); *E05Y 2900/531* (2013.01)

(58) Field of Classification Search
CPC .. B62D 25/20; B62D 25/2036; B62D 25/025; B62D 25/04
USPC ..................................... 296/155, 209, 29, 30
See application file for complete search history.

(56) References Cited

U.S. PATENT DOCUMENTS

2005/0146159 A1\*  7/2005  Shen ....................... E05D 15/34
                                                                 296/155

FOREIGN PATENT DOCUMENTS

EP         1741619 A1 \*  1/2007  ............... B60J 5/06
KR    100552528 B1 \*  2/2006

\* cited by examiner

*Primary Examiner* — Dennis H Pedder
(74) *Attorney, Agent, or Firm* — Slater Matsil, LLP

(57) ABSTRACT

An embodiment sliding door mounting reinforcement structure includes a sliding door lower reinforcement configured to be mounted on a side of a vehicle body along a length direction of the vehicle body, the sliding door lower reinforcement including a guide rail mounted therein, the guide rail being configured to guide movement of a sliding door, and a center floor cross unit configured to be mounted in a width direction of the vehicle body, wherein the sliding door lower reinforcement and the center floor cross unit are combined.

22 Claims, 8 Drawing Sheets

SLIDING DOOR MOUNTING REINFORCEMENT STRUCTURE AND VEHICLE BODY PROVIDED WITH THE SAME

CROSS-REFERENCE TO RELATED APPLICATIONS

This application claims the benefit of Korean Patent Application No. 10-2021-01179693, filed on Dec. 15, 2021, which application is hereby incorporated herein by reference.

TECHNICAL FIELD

The present invention relates to a vehicle body reinforcement structure.

BACKGROUND

Recently, the vehicle industry is introducing a new concept of future mobility vision for realizing a human-centered and dynamic future city. One of these future mobility solutions is a PBV (Purpose Built Vehicle) as a purpose-based mobility.

A PBV is an electric vehicle-based (EV) environment-friendly vehicle that provides a variety of customized services to users. The vehicle body of this PBV includes an under body (also called a rolling chassis or skateboard in the industry) and an upper body assembled to the under body.

Here, the upper body may be configured in various forms according to the type of customized service of the PBV. For example, the PBV has only one door in front of the vehicle, and the door is not applied to the passenger seat, so that the vehicle body can be configured more economically.

However, if the door is not applied to the passenger seat and a door, for example, a sliding door, is applied to the rear of the passenger seat, a difference in vehicle body strength between the part to which the sliding door is applied and the side of the passenger seat position may occur.

This local strength difference of the vehicle body may exacerbate the breakage and buckling phenomenon of the sliding door part, which has relatively weak strength during a side impact of the vehicle.

The above information disclosed in this background section is only for enhancement of understanding of the background of the invention, and therefore it may contain information that does not form the prior art that is already known to a person of ordinary skill in the art.

SUMMARY

The present invention relates to a vehicle body reinforcement structure. Particular embodiments relate to a sliding door mounting reinforcement structure and a vehicle body provided with the same capable of making the side strength of the vehicle body uniform.

Embodiments of the present invention provide a sliding door mounting reinforcement structure and a vehicle body provided with the same capable of uniform vehicle body strength.

A sliding door mounting reinforcement structure according to an exemplary embodiment of the present invention may include a sliding door lower reinforcement of which a guide rail that guides movement of a sliding door is mounted therein mounted on a side of the vehicle body along a length direction of the vehicle body, and a center floor cross unit mounted in the width direction of the vehicle body, wherein the sliding door lower reinforcement and the center floor cross unit are combined.

The sliding door lower reinforcement may include a main body on which the guide rail is mounted, and a longitudinal direction extension formed extending from the main body along the length direction of the vehicle body, and wherein the center floor cross unit may include a first center floor cross member coupled to the vicinity of one end of the longitudinal direction extension.

The center floor cross unit may further include a second center floor cross member coupled to the vicinity of the connection portion of the main body and the longitudinal direction extension.

The sliding door mounting reinforcement structure according to an exemplary embodiment of the present invention may further include a center pillar disposed in the height direction of the vehicle body and combined with the sliding door lower reinforcement.

The center pillar may be disposed between the first center floor cross member and the second center floor cross member in the length direction of the vehicle body.

The center pillar may include a center pillar inner panel coupled with a center pillar upper coupling part formed extending in the height direction of the vehicle body from the sliding door lower reinforcement, and a center pillar outer panel coupled with a center pillar lower coupling part formed extending from the sliding door lower reinforcement in the width direction of the vehicle body.

The sliding door lower reinforcement and the center pillar may form a center pillar closed cross-section inside the coupling part.

The sliding door mounting reinforcement structure according to an exemplary embodiment of the present invention may further include a side sill inner provided inside the center pillar closed cross-section.

The sliding door mounting reinforcement structure according to an exemplary embodiment of the present invention may further include a cross reinforcement connecting the first center floor cross member and the side sill inner.

The sliding door mounting reinforcement structure according to an exemplary embodiment of the present invention may further include a side sill outer provided in the width direction of the vehicle body, and the side sill outer may connect the center pillar lower coupling part and the center pillar outer panel.

The sliding door mounting reinforcement structure according to an exemplary embodiment of the present invention may further include a center floor coupled to the upper portion of the center floor cross unit, and the center floor, the center floor cross unit and the sliding door lower reinforcement may form a center closed cross-section.

The longitudinal direction extension may include a center floor cross unit coupling part formed in a concave shape so that the center floor cross unit is inserted and coupled.

The vehicle body may be a doorless vehicle body without a door in front of the sliding door.

According to an exemplary embodiment of the present invention, the sliding door mounting reinforcement structure and the vehicle body including the same may make the strength of the side of the vehicle body uniform, thereby enhancing the side impact performance of the vehicle body.

Particularly, according to an exemplary embodiment of the present invention, the sliding door mounting reinforcement structure and the vehicle body including the same may be applied to the doorless vehicle body without a door in front of the sliding door, so that it is possible to reduce the local strength difference of the vehicle body.

In addition, the effects obtainable or predicted by the embodiments of the present invention are to be disclosed directly or implicitly in the detailed description of the embodiments of the present invention. That is, various effects predicted according to an embodiment of the present invention will be disclosed in the detailed description to be described later.

BRIEF DESCRIPTION OF THE DRAWINGS

Since these drawings are for reference in explaining exemplary embodiments of the present invention, the technical idea of the present invention should not be construed as being limited to the accompanying drawings.

DETAILED DESCRIPTION OF ILLUSTRATIVE EMBODIMENTS

Figure 1:
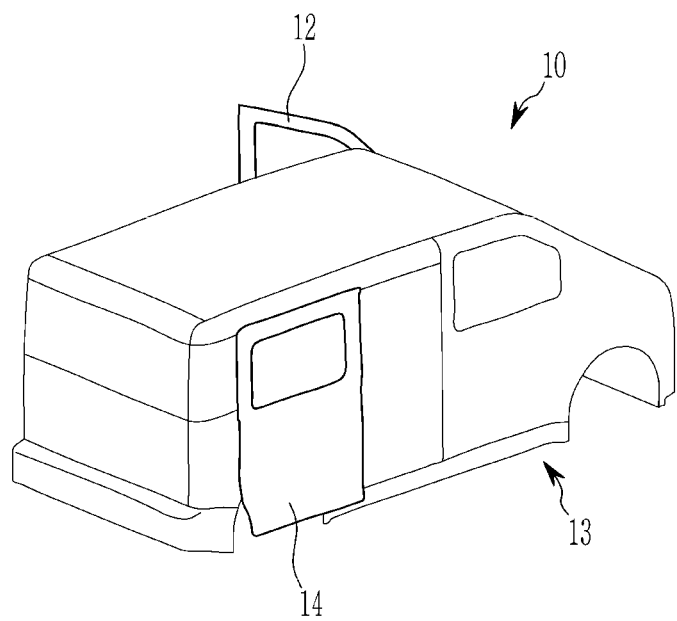
FIG. 1 is an external perspective view of a vehicle body to which a sliding door mounting reinforcement structure according to an exemplary embodiment of the present invention may be applied.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to those shown in the drawings, and the thicknesses are enlarged to clearly express various parts and regions.

In addition, in the following detailed description, the reason that the names of components are divided into first, second, etc. is to classify them in the same relationship, and it is not necessarily limited to the order in the following description.

Throughout the specification, when a part includes a certain element, it means that other elements may be further included, rather than excluding other elements, unless specifically stated otherwise.

In addition, terms such as . . . part . . . described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

FIG. 1 is an external perspective view of a vehicle body to which a sliding door mounting reinforcement structure according to an exemplary embodiment of the present invention may be applied.

Referring to FIG. 1, a vehicle body 10 to which a sliding door mounting reinforcement structure according to an exemplary embodiment of the present invention may be applied includes a front door 12 and a sliding door 14 may be mounted in the opposite direction in which the front door 12 is mounted.

The vehicle body 10 may be a doorless vehicle body 10 without a door of the front passenger seat 13 in front of the sliding door 14.

The side of the front passenger seat 13 has relatively high strength because there is no door, but the mount position of the sliding door 14 has relatively low strength.

Therefore, the difference in strength between the side of the passenger seat 13 and the sliding door 14 is large, so that the damage of the sliding door 14 is relatively large during a side collision of the vehicle, which may be a risk to the safety of the occupant.

Figure 2:
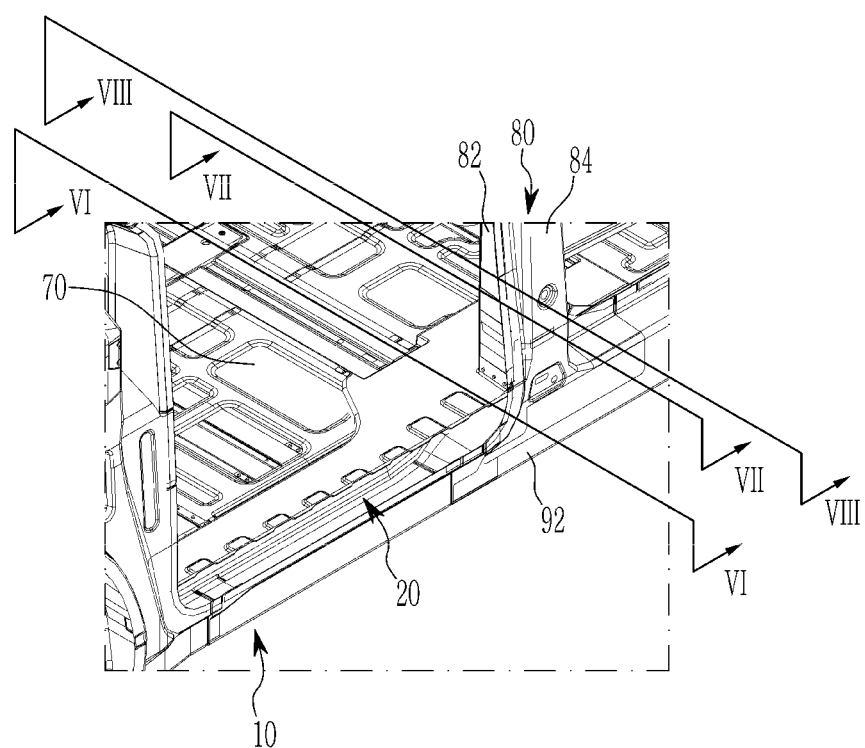
FIG. 2 is a partial perspective view of the sliding door mounting reinforcement structure according to an exemplary embodiment of the present invention viewed from the outside of the vehicle body.
Figure 3:
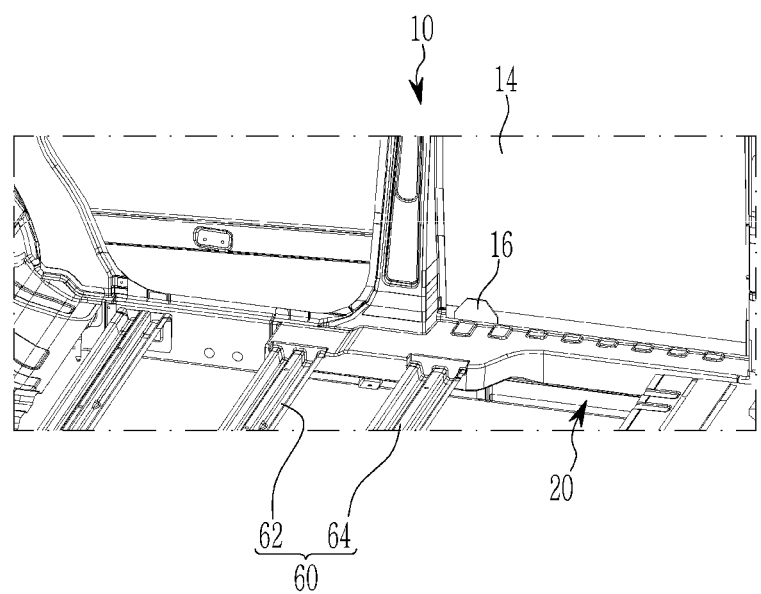
FIG. 3 is a partial perspective view of a sliding door mounting reinforcement structure according to an exemplary embodiment of the present invention viewed from the inside of the vehicle body.

FIG. 2 is a partial perspective view of the sliding door mounting reinforcement structure according to an exemplary embodiment of the present invention viewed from the outside of the vehicle body, and FIG. 3 is a partial perspective view of a sliding door mounting reinforcement structure according to an exemplary embodiment of the present invention viewed from the inside of the vehicle body.

Figure 4:
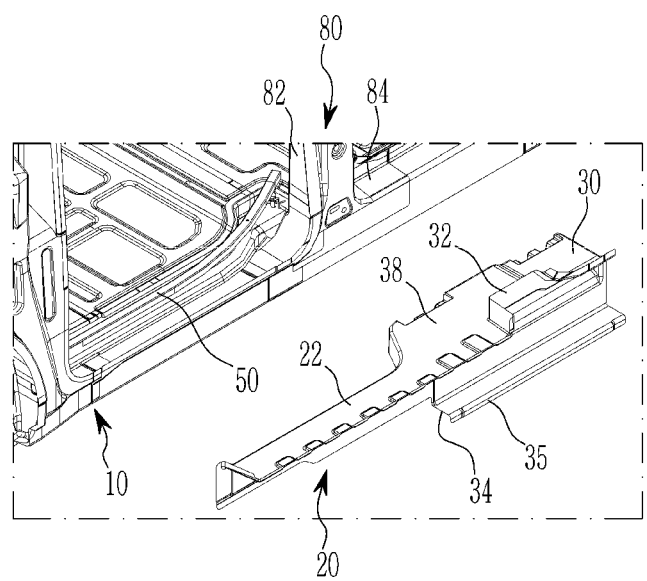
FIG. 4 is a partially exploded perspective view of a sliding door mounting reinforcement structure according to an exemplary embodiment of the present invention.
Figure 5:
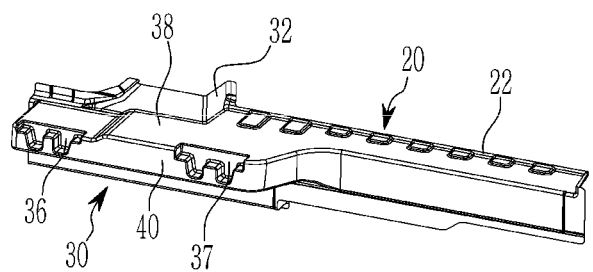
FIG. 5 is a perspective view of a sliding door lower reinforcement that may be applied to a sliding door mounting reinforcement structure according to an exemplary embodiment of the present invention.
Figure 6:
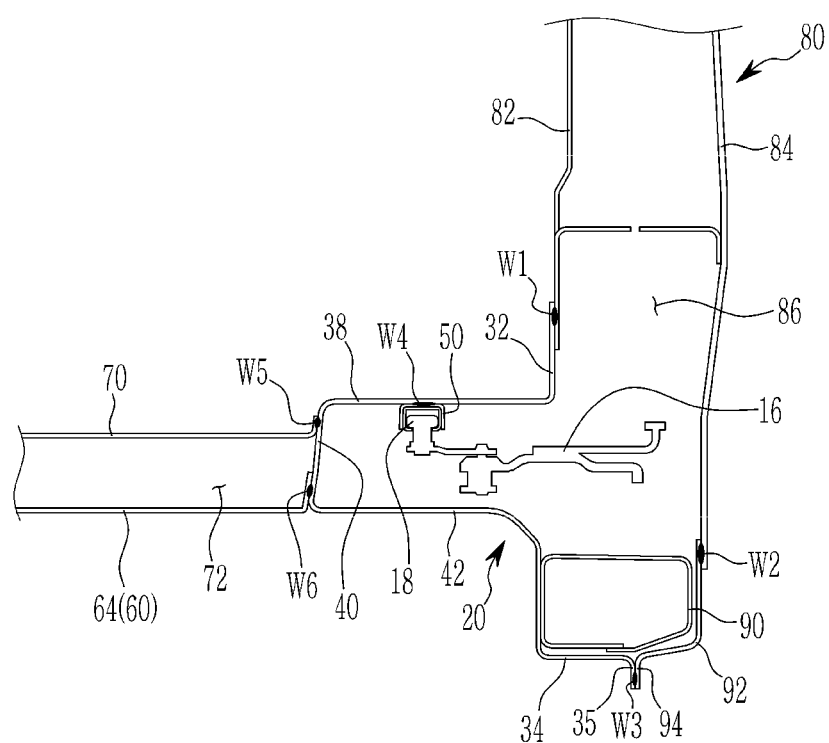
FIG. 6 is a cross-sectional view along the VI-VI line in FIG. 2.

FIG. 4 is a partially exploded perspective view of a sliding door mounting reinforcement structure according to an exemplary embodiment of the present invention, FIG. 5 is a perspective view of a sliding door lower reinforcement that may be applied to a sliding door mounting reinforcement structure according to an exemplary embodiment of the present invention, and FIG. 6 is a cross-sectional view along the VI-VI line in FIG. 2.

Referring to FIG. 1 to FIG. 6, a sliding door mounting reinforcement structure according to an exemplary embodiment of the present invention may include a sliding door lower reinforcement 20 of which a guide rail 50 (see FIG. 4 and FIG. 6) that guides movement of the sliding door 14 is mounted therein mounted on the side of the vehicle body 10 along a length direction of the vehicle body 10, and a center floor cross unit 60 mounted in the width direction of the vehicle body 10.

And, the sliding door lower reinforcement 20 and the center floor cross unit 60 may be combined.

When the sliding door lower reinforcement 20 and the center floor cross unit 60 are combined, the strength of the part where the sliding door 14 is mounted may be increased, and thus the difference in strength with the part where the passenger seat 13 is positioned may be reduced.

The guide rail 50 may be mounted on the sliding door lower reinforcement 20 with its cross-section in an inverted "U" shape to guide the movement of a lower roller 18.

The lower roller 18 may be mounted to the sliding door 14 via a sliding door roller bracket 16.

The sliding door lower reinforcement 20 may include a main body 22 on which the guide rail 50 is mounted, and a longitudinal direction extension 30 formed extending from the main body 22 along the length direction of the vehicle body 10.

The center floor cross unit 60 may include a first center floor cross member 62 coupled to the vicinity of one end of the longitudinal direction extension 30.

In addition, the center floor cross unit 60 may further include a second center floor cross member 64 coupled to the vicinity of the connection portion of the main body 22 and the longitudinal direction extension 30.

The sliding door mounting reinforcement structure according to an exemplary embodiment of the present invention may further include a center pillar 80 disposed in the height direction of the vehicle body 10 and combined with the sliding door lower reinforcement 20.

The center pillar 80 may be disposed between the first center floor cross member 62 and the second center floor cross member 64 in the length direction of the vehicle body 10.

The sliding door lower reinforcement 20 may further include a center pillar upper coupling part 32 formed to extend in the height direction of the vehicle body 10 to couple with the center pillar 80.

The longitudinal direction extension 30 may include center floor cross unit coupling parts 36 and 37 formed in a concave shape so that the center floor cross unit 60 is inserted and coupled.

The first center floor cross member 62 and the second center floor cross member 64 may be coupled to the center floor cross unit coupling parts 36 and 37, respectively, and the center pillar upper coupling part 32 may be formed between the center floor cross unit coupling parts 36 and 37.

That is, the longitudinal direction extension 30 is formed to extend forward of the vehicle body 10 rather than the center pillar 80 to increase the strength of the side of the vehicle body.

Therefore, the impact load transmitted from the center pillar 80 during a side impact of the vehicle is transmitted to the first center floor cross member 62 and the second center floor cross member 64 through the center pillar upper coupling part 32 and the center floor cross unit coupling parts 36 and 37 of the longitudinal direction extension 30, so that the impact load may be distributed.

In addition, since the first center floor cross member 62 and the second center floor cross member 64 support the longitudinal direction extension 30, the difference in strength between the part where the sliding door 14 is mounted and the part where the passenger seat 13 is positioned is reduced.

The longitudinal direction extension 30 may be formed to extend inside the vehicle body 10.

That is, the longitudinal direction extension 30 extends to the inside of the vehicle body 10, and it is possible to increase the strength of the coupling portion between the center pillar 80 and the first center floor cross member 62 and the second center floor cross member 64, so that it is possible to improve the performance of vehicle side collisions.

The longitudinal direction extension 30 may include an extension upper surface 38 extending inward of the vehicle body 10, an extension side surface 40 curved from the extension upper surface 38 and of which the center floor cross unit coupling parts 36 and 37 are formed thereto, an extension lower surface 42 curved from the extension side surface 40, and a center pillar lower coupling part 34 that is curved from the extension lower surface 42 to the lower direction and is coupled to the center pillar 80.

The center pillar lower coupling part 34 may be formed to extend downward in the width direction of the vehicle body 10.

The center pillar 80 may include a center pillar inner panel 82 coupled with the center pillar upper coupling part 32 and a center pillar outer panel 84 coupled with the center pillar lower coupling part 34.

Figure 7:
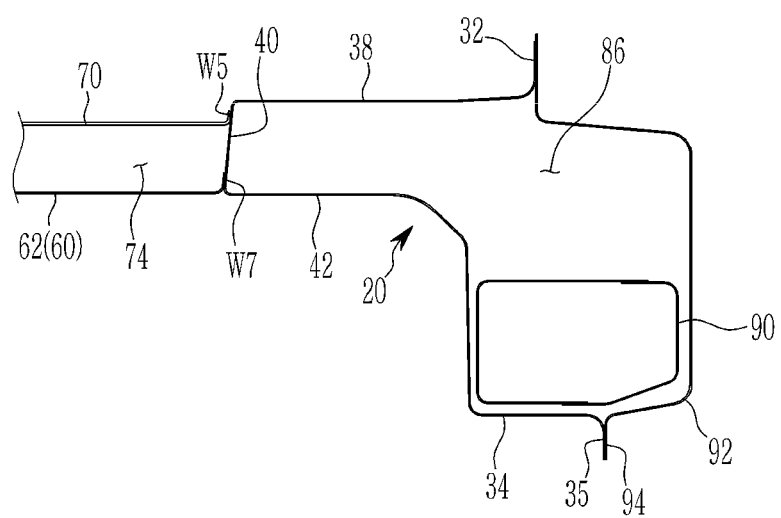
FIG. 7 is a cross-sectional view along the line VII-VII in FIG. 2.

FIG. 7 is a cross-sectional view along the line VII-VII in FIG. 2.

Referring to FIG. 2 to FIG. 7, the sliding door mounting reinforcement structure according to an exemplary embodiment of the present invention further includes a side sill outer 92 provided in the width direction of the vehicle body 10, and the side sill outer 92 may connect the center pillar lower coupling part 34 and the center pillar outer panel 84.

The sliding door lower reinforcement 20 and the center pillar 80 may form a center pillar closed cross-section 86 inside the coupling part.

The sliding door mounting reinforcement structure according to an exemplary embodiment of the present invention further includes a center floor 70 coupled to the upper portion of the center floor cross unit 60, and the center floor 70, the center floor cross unit 60 and the sliding door lower reinforcement 20 may form center closed cross-sections 72 and 74.

The sliding door mounting reinforcement structure according to an exemplary embodiment of the present invention may further include a side sill inner 90 provided inside the center pillar closed cross-section 86.

The center pillar inner panel 82 and the center pillar upper coupling part 32 may be welded at point W1, and the welding direction is formed in the width direction of the vehicle body 10 to respond to the vehicle body side impact load.

The center pillar outer panel 84 and the side sill outer 92 may be welded at point W2, and the welding direction is formed in the width direction of the vehicle body 10 to respond to the vehicle body side impact load.

A side sill outer flange 94 may be formed at one end of the side sill outer 92, and a center pillar lower coupling part flange 35 may be formed at one end of the center pillar lower coupling part 34.

The side sill outer flange 94 and the center pillar lower coupling part flange 35 may be welded at point W3, and the welding direction is formed in the width direction of the vehicle body 10 to respond to the vehicle body side impact load.

The guide rail 50 may be welded at point W4 to the extension upper surface 38, and the welding direction may be formed in the height direction of the vehicle body 10.

The center floor 70 may be welded at point W5 to the extension side surface 40, and the welding direction is formed in the width direction of the vehicle body 10 to respond to the vehicle body side impact load.

The second center floor cross member 64 may be welded at point W6 to the extension side surface 40, and the welding direction is formed in the width direction of the vehicle body 10 to respond to the vehicle body side impact load.

As shown in FIG. 7, the first center floor cross member 62 may be welded at point W7 to the extension side surface 40, and the welding direction is formed in the width direction of the vehicle body 10 to respond to the vehicle body side impact load.

The sliding door lower reinforcement 20 and the center pillar 80 may form the center pillar closed cross-section 86 inside the coupling part, and the center floor 70, the center floor cross unit 60 and the sliding door lower reinforcement 20 may form the center closed cross-sections 72 and 74 adjacent to the center pillar closed cross-section 86.

The double closed cross-section structure of the center pillar closed cross-section 86 and the center closed cross-sections 72 and 74 may respond with the vehicle body side impact load.

The side sill inner 90 is mounted in the space formed by the extension lower surface 42, the center pillar lower coupling part 34 and the center pillar 80 to increase the length direction strength of the vehicle body 10 and the width direction strength of the vehicle body 10.

The space utilization may be increased by mounting the sliding door roller bracket 16 and the lower roller 18 using the inner space of the center pillar closed cross-section 86, and the sliding door roller bracket 16 may bear the impact load in case of a vehicle body side collision.

Figure 8:
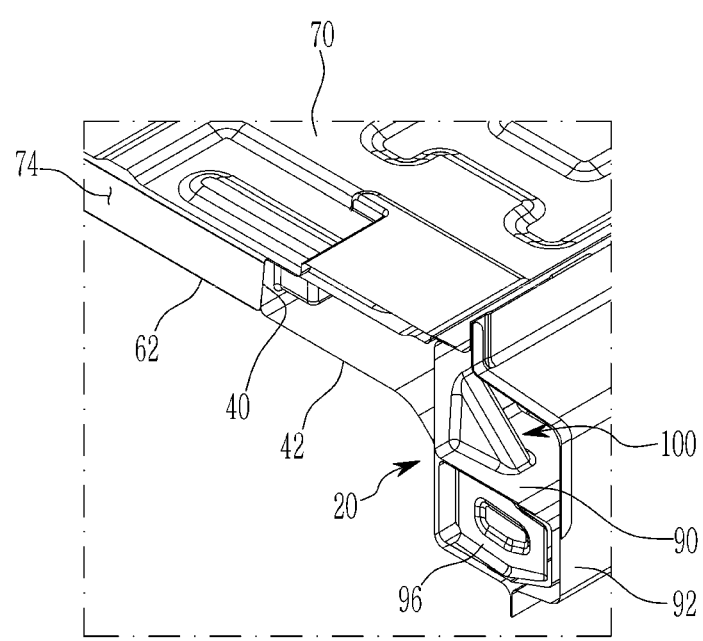
FIG. 8 is a cross-section perspective view along the line VIII-VIII in FIG. 2.

FIG. 8 is a cross-section perspective view along the line VIII-VIII in FIG. 2.

Referring to FIG. 8, the sliding door mounting reinforcement structure according to an exemplary embodiment of the present invention may further include a cross reinforcement 100 connecting the first center floor cross member 62 and the side sill inner 90.

The cross reinforcement 100 may respond to the side impact load by connecting the first center floor cross member 62 and the side sill inner 90.

A bulk head 96 may be mounted near the connection position of the cross reinforcement 100 and the side sill inner 90 to increase the lateral strength.

As described above, even if the vehicle body to which the sliding door mounting reinforcement structure according to the embodiments of the present invention is applied is a doorless vehicle body without a door in front of the sliding door, the rigidity may be uniform, so that passengers may be protected from a side collision of the vehicle body.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A sliding door mounting reinforcement structure, the structure comprising:
   a side sill inner;
   a sliding door lower reinforcement configured to be mounted on a side of a vehicle body along a length direction of the vehicle body, the sliding door lower reinforcement surrounding the side sill inner and comprising a guide rail mounted therein, the guide rail being configured to guide a movement of a sliding door; and
   a center floor cross unit configured to be mounted in a width direction of the vehicle body, wherein the sliding door lower reinforcement and the center floor cross unit are combined.

2. The structure of claim 1,
   wherein the sliding door lower reinforcement comprises a main body on which the guide rail is mounted and a longitudinal direction extension extending from the main body along the length direction of the vehicle body, and
   wherein the center floor cross unit comprises a first center floor cross member coupled to an end of the longitudinal direction extension.

3. The structure of claim 2, wherein the center floor cross unit further comprises a second center floor cross member coupled to a connection portion of the main body and the longitudinal direction extension.

4. The structure of claim 3, further comprising a center pillar disposed in a height direction of the vehicle body and combined with the sliding door lower reinforcement.

5. The structure of claim 4, wherein the center pillar is disposed between the first center floor cross member and the second center floor cross member in the length direction of the vehicle body.

6. The structure of claim 4, wherein the center pillar comprises:
   a center pillar inner panel coupled with a center pillar upper coupling part extending in the height direction of the vehicle body from the sliding door lower reinforcement; and
   a center pillar outer panel coupled with a center pillar lower coupling part extending from the sliding door lower reinforcement in the width direction of the vehicle body.

7. The structure of claim 6, wherein the sliding door lower reinforcement and the center pillar define a center pillar closed cross-section inside the coupling parts.

8. The structure of claim 7, wherein the side sill inner is located inside the center pillar closed cross-section.

9. The structure of claim 8, further comprising a cross reinforcement connecting the first center floor cross member and the side sill inner.

10. The structure of claim 6, further comprising a side sill outer provided in the width direction of the vehicle body, the side sill outer connecting the center pillar lower coupling part and the center pillar outer panel.

11. The structure of claim 2, further comprising a center floor coupled to an upper portion of the center floor cross unit, wherein the center floor, the center floor cross unit, and the sliding door lower reinforcement define a center closed cross-section.

12. The structure of claim 2, wherein the longitudinal direction extension comprises a center floor cross unit coupling part having a concave shape such that the center floor cross unit is inserted and coupled.

13. A vehicle comprising:
   a vehicle body;
   a door coupled to a driver side of the vehicle body;
   a side sill inner;
   a sliding door lower reinforcement mounted on a passenger side of the vehicle body along a length direction of the vehicle body and surrounding the side sill inner;
   a sliding door coupled to the sliding door lower reinforcement on the passenger side of the vehicle body, wherein no door is located on the passenger side of the vehicle body in front of the sliding door in the length direction of the vehicle body;
   a guide rail mounted in the sliding door lower reinforcement, the guide rail being configured to guide a movement of the sliding door; and a center floor cross unit mounted in a width direction of the vehicle body, wherein the sliding door lower reinforcement and the center floor cross unit are combined.

14. The vehicle of claim 13,
wherein the sliding door lower reinforcement comprises:
a main body on which the guide rail is mounted; and
a longitudinal direction extension extending from the main body along the length direction of the vehicle body, and
wherein the center floor cross unit comprises a first center floor cross member coupled to an end of the longitudinal direction extension.

15. The vehicle of claim 14, wherein the center floor cross unit further comprises a second center floor cross member coupled to a connection portion of the main body and the longitudinal direction extension.

16. The vehicle of claim 15, further comprising a center pillar disposed in a height direction of the vehicle body between the first center floor cross member and the second center floor cross member in the length direction of the vehicle body, wherein the center pillar is combined with the sliding door lower reinforcement.

17. The vehicle of claim 16, wherein the center pillar comprises:
a center pillar inner panel coupled with a center pillar upper coupling part extending in the height direction of the vehicle body from the sliding door lower reinforcement; and
a center pillar outer panel coupled with a center pillar lower coupling part extending from the sliding door lower reinforcement in the width direction of the vehicle body.

18. The vehicle of claim 17,
wherein the sliding door lower reinforcement and the center pillar define a center pillar closed cross-section inside the coupling parts, and
wherein
the side sill inner is located inside the center pillar closed cross-section,
wherein a cross reinforcement connecting the first center floor cross member and the side sill inner, and
wherein a side sill outer provided in the width direction of the vehicle body, the side sill outer connecting the center pillar lower coupling part and the center pillar outer panel.

19. The vehicle of claim 14, further comprising a center floor coupled to an upper portion of the center floor cross unit, wherein the center floor, the center floor cross unit, and the sliding door lower reinforcement define a center closed cross-section.

20. The vehicle of claim 14, wherein the longitudinal direction extension comprises a center floor cross unit coupling part having a concave shape such that the center floor cross unit is inserted and coupled.

21. A sliding door mounting reinforcement structure, the structure comprising:
a sliding door lower reinforcement configured to be mounted on a side of a vehicle body along a length direction of the vehicle body, the sliding door lower reinforcement comprising a guide rail mounted therein, the guide rail being configured to guide a movement of a sliding door;
a center floor cross unit configured to be mounted in a width direction of the vehicle body, wherein the sliding door lower reinforcement and the center floor cross unit are combined,
wherein the sliding door lower reinforcement comprises a main body on which the guide rail is mounted and a longitudinal direction extension extending from the main body along the length direction of the vehicle body,
wherein the center floor cross unit comprises a first center floor cross member coupled to an end of the longitudinal direction extension, and
wherein the center floor cross unit further comprises a second center floor cross member coupled to a connection portion of the main body and the longitudinal direction extension; and
a center pillar disposed in a height direction of the vehicle body and combined with the sliding door lower reinforcement,
wherein the center pillar comprises a center pillar inner panel coupled with a center pillar upper coupling part extending in the height direction of the vehicle body from the sliding door lower reinforcement,
wherein a center pillar outer panel is coupled with a center pillar lower coupling part extending from the sliding door lower reinforcement in the width direction of the vehicle body, and
wherein the sliding door lower reinforcement and the center pillar define a center pillar closed cross-section inside the coupling parts.

22. A sliding door mounting reinforcement structure, the structure comprising:
a sliding door lower reinforcement configured to be mounted on a side of a vehicle body along a length direction of the vehicle body, the sliding door lower reinforcement comprising a guide rail mounted therein, the guide rail being configured to guide a movement of a sliding door;
a center floor cross unit configured to be mounted in a width direction of the vehicle body, wherein the sliding door lower reinforcement and the center floor cross unit are combined,
wherein the sliding door lower reinforcement comprises a main body on which the guide rail is mounted and a longitudinal direction extension extending from the main body along the length direction of the vehicle body, and
wherein the center floor cross unit comprises a first center floor cross member coupled to an end of the longitudinal direction extension; and
a center floor coupled to an upper portion of the center floor cross unit,
wherein the center floor, the center floor cross unit, and the sliding door lower reinforcement define a center closed cross-section.

\* \* \* \* \*